(12) United States Patent
Bouchez et al.

(10) Patent No.: US 6,672,068 B1
(45) Date of Patent: Jan. 6, 2004

(54) RAMJET FOR A SUPERSONIC AND HYPERSONIC AIRCRAFT

(75) Inventors: Marc Bouchez, Bourges (FR); François Falempin, St Arnoult en Yvelines (FR); Vadim Levine, Moscou (RU)

(73) Assignee: MBDA France, Paris (FR)

( * ) Notice: Subject to any disclaimer, the term of this patent is extended or adjusted under 35 U.S.C. 154(b) by 5 days.

(21) Appl. No.: 10/208,752

(22) Filed: Aug. 1, 2002

(30) Foreign Application Priority Data

Sep. 4, 2001 (FR) .............................. 01 11413

(51) Int. Cl.⁷ .............................. F01K 7/10; F01K 7/14
(52) U.S. Cl. .................................... 60/768; 60/767
(58) Field of Search .................................... 60/767, 768

(56) References Cited

U.S. PATENT DOCUMENTS

| | | | |
|---|---|---|---|
| 3,407,603 A | * 10/1968 | Kelley et al. | ............... 60/767 |
| 3,430,446 A | * 3/1969 | McCloy | ............... 60/768 |
| 3,456,664 A | 7/1969 | Foote | |
| 5,727,382 A | 3/1998 | Chevalier et al. | |

FOREIGN PATENT DOCUMENTS

GB 2222635 3/1990

OTHER PUBLICATIONS

Search Report dated May 14, 2002.

* cited by examiner

*Primary Examiner*—Ted Kim
(74) *Attorney, Agent, or Firm*—Stevens, Davis, Miller & Mosher, LLP

(57) ABSTRACT

According to the invention, the wall (5) is mounted movably as one so as to be able to slide longitudinally in translation, bringing the joint line (14) closer to the fuel injector (9) so as progressively to modify the geometries of the oxidant inlet (16) and of the combustion chamber (15), said geometries passing progressively from a first state (I) in which, for a Mach number lying between 1.5 and 3, said oxidant inlet (16) constricts said oxidant flow only slightly and the combustion chamber (15) is long and divergent, to a second state (III) in which, for a Mach number lying between 8 and 12, said oxidant inlet (16) strongly constricts said oxidant flow and said combustion chamber (15) is shorter and exhibits a constant cross section.

5 Claims, 5 Drawing Sheets

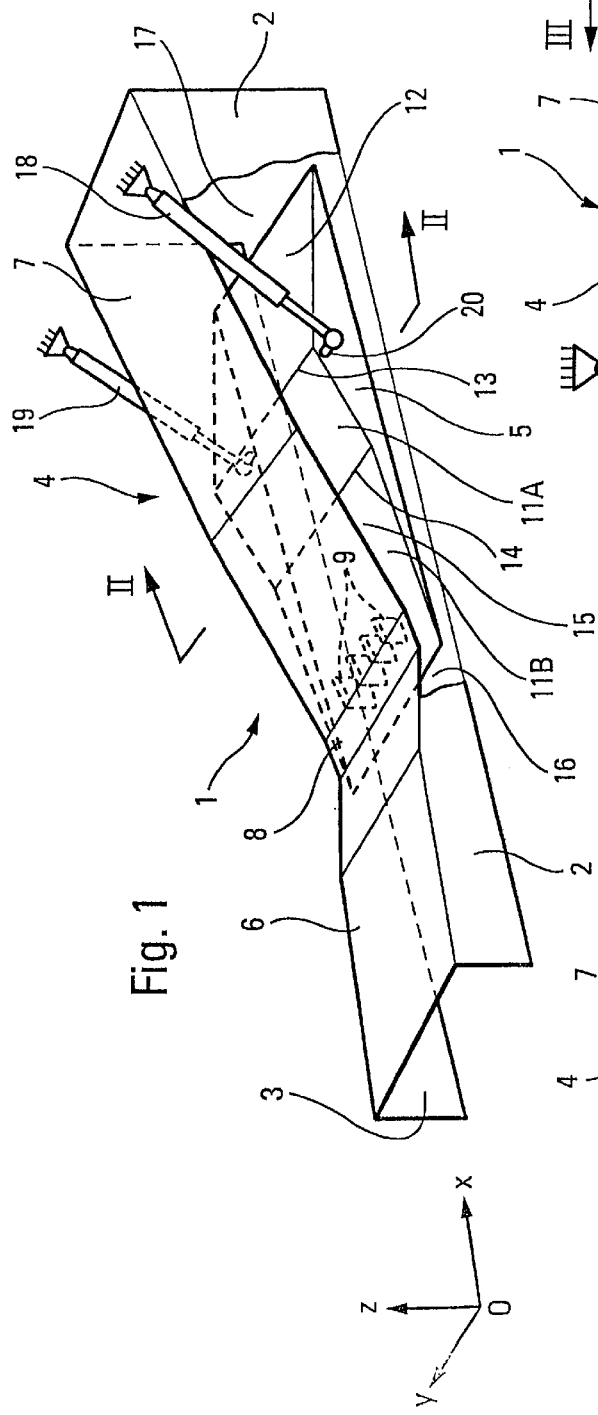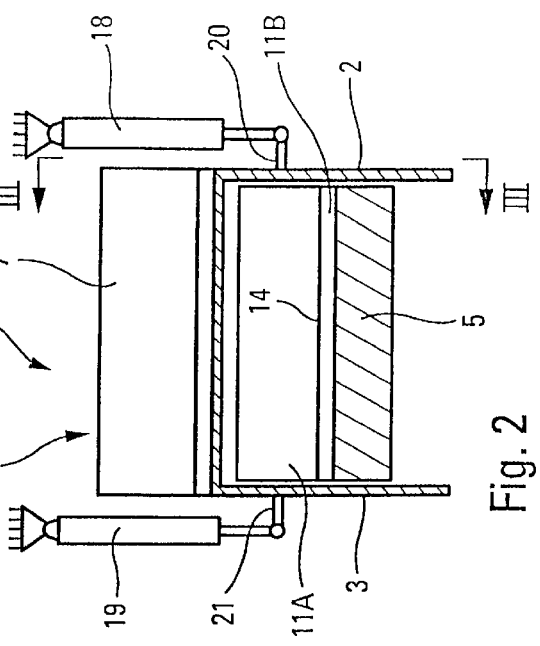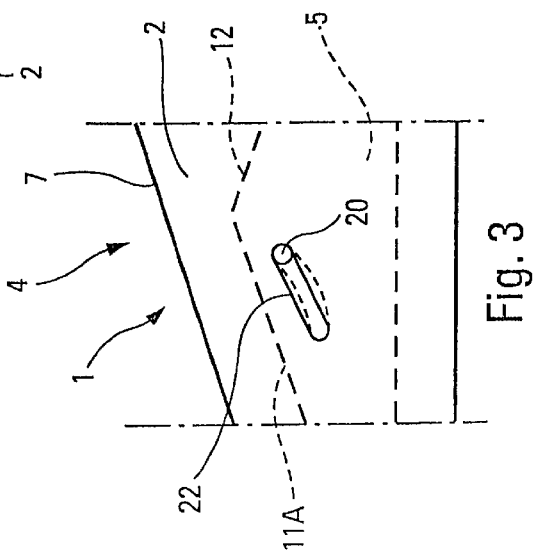

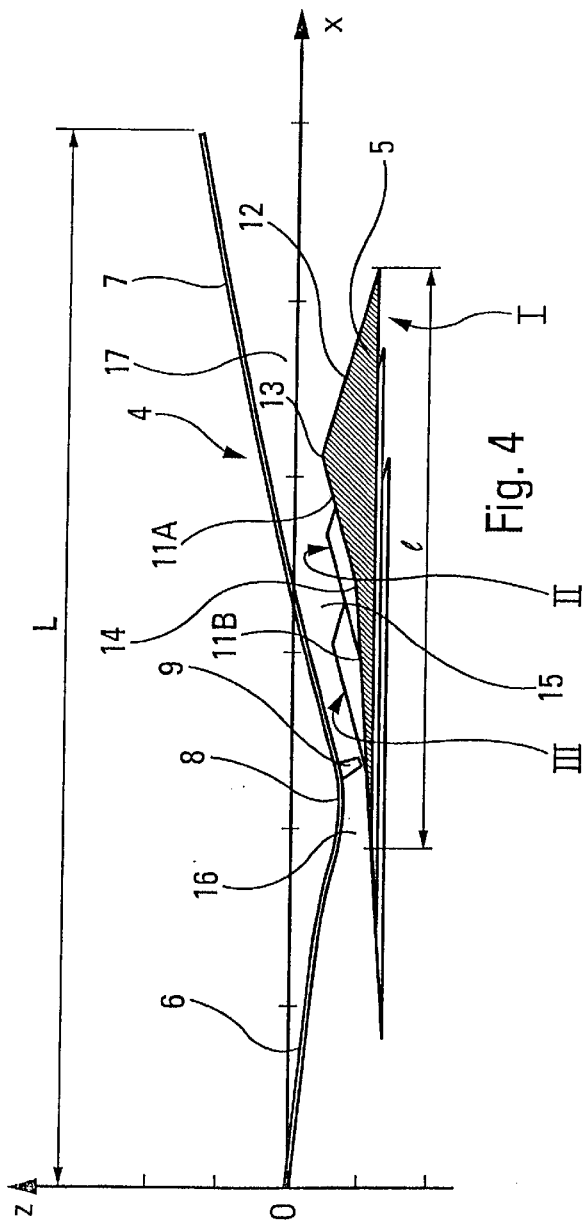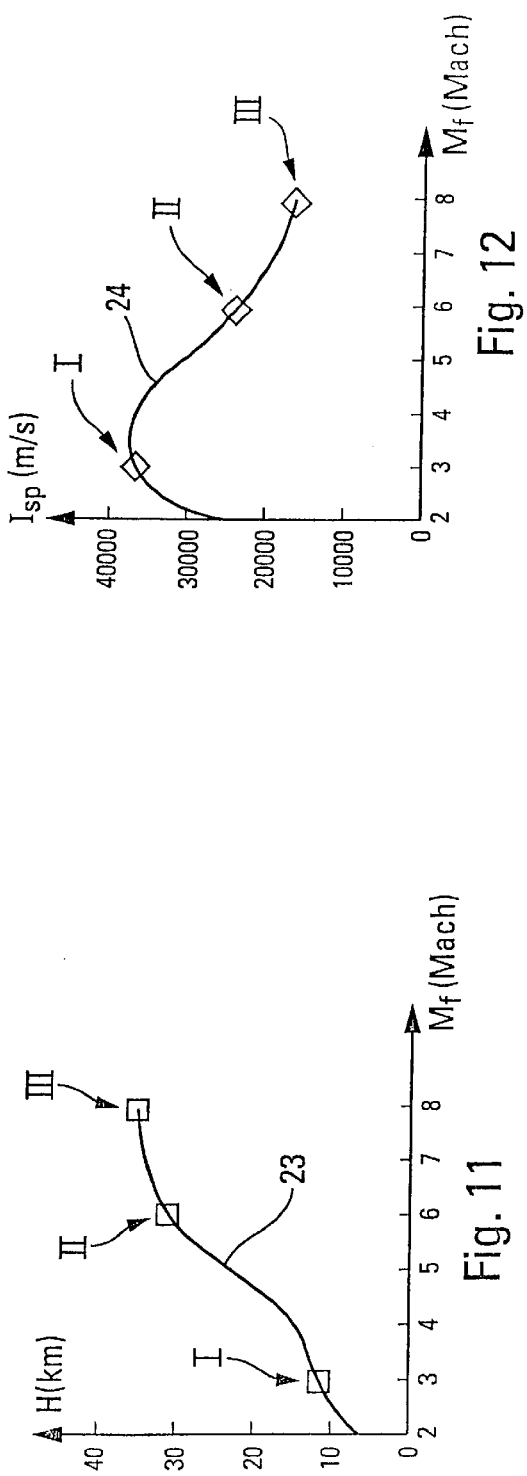

RAMJET FOR A SUPERSONIC AND HYPERSONIC AIRCRAFT

The present invention relates to a ramjet for a supersonic and hypersonic aircraft, intended to operate over a wide range of speeds, especially between Mach 2 and Mach 8.

The design of such a ramjet, generally called compound ramjet because it possesses an extended operating domain, by virtue of the succession of a subsonic combustion phase and of a supersonic combustion phase, raises numerous difficulties both as regards the definition of the aerodynamic stream as well as the production of the structure delimiting this stream.

Various techniques have been employed in order to attempt to overcome these difficulties. Among these techniques, one of the most interesting is that described by the document U.S. Pat. No. 5,727,382.

This document describes a ramjet including an elongate ramjet body which consists of four walls opposite in pairs, which between them delimit:
- an inlet for a flow of oxidant,
- a variable-geometry combustion chamber, which is provided with at least one fuel injector and in which the oxidant/fuel mixing and the combustion of said mixture are carried out, and
- an exhaust nozzle, channeling the gases leaving said combustion chamber, two of said opposite walls being flat and parallel to each other.

In this known ramjet, one of the other two opposite walls is produced by the use of plates which are articulated one after the other, so as to be deformable. A system of actuators makes it possible to set up and maintain said deformable wall in the geometry desired as a function of the conditions of flight. The advantage of such a controlled deformable wall lies in the capability of precisely adapting the progressive changes in the cross section of the combustion chamber along the length of the chamber to each flight condition, and in the possibility of putting in place a geometric-nozzle neck suitable for subsonic combustion. On the other hand, the practical production of such a ramjet is complex and expensive, especially because of the changes between moving plates. Moreover, in order to be able to form a satisfactory subsonic combustion chamber, this ramjet has to include a supersonic combustion chamber which is a little too long, which to a degree limits the performance of said ramjet at high speed and complicates its cooling.

Furthermore, the document GB-2 222 635 describes a ramjet for a supersonic and hypersonic aircraft, including an elongate body which consists of:
- two sidewalls, flat and parallel to each other;
- a fixed upper wall, integral with said sidewalls and exhibiting, in profile, the rigid general shape of a V open at an obtuse angle, in such a way that said upper wall includes a front flank and a rear flank which are inclined with respect to one another and linked by a ridge which is at least approximately orthogonal to said sidewalls; and
- a lower wall mounted movably as one between said sidewalls so as to be able to slide longitudinally in translation, said lower wall also featuring, in profile, the rigid general shape of a V open at an obtuse angle, but reversed with respect to that of said upper wall, said lower wall thus including a front flank and a rear flank which are inclined with respect to one another and linked by a ridge at least approximately orthogonal to said sidewalls, said walls of said body delimiting between them:
- an inlet for a flow of oxidant;
- a combustion chamber, which is provided with at least one fuel injector and in which the oxidant/fuel mixing and the combustion of said mixture are carried out; and
- an exhaust nozzle, channeling the gases leaving said combustion chamber and formed between said rear flank of the upper wall and the rear flank of the lower wall.

In this latter document, the sliding lower wall acts as a shock diffuser.

The object of the present invention is such a ramjet with sliding lower wall making it possible to obtain an optimal combustion chamber, whether the combustion is subsonic or supersonic.

To that end, according to the invention, the ramjet with sliding lower wall, of the type reiterated above, is noteworthy in that:
- said fuel injector is arranged in the vicinity of the ridge of said upper wall;
- said front flank of the lower wall includes:
  - at least one first face, in a general direction at least substantially parallel to the rear flank of said upper wall and arranged facing said rear flank of said upper wall; and
  - at least one second face, linked securely to said first face along a joint line at least approximately orthogonal to said sidewalls, said second face being inclined with respect to said first face in such a way that, facing said upper wall, the assembly of said first face and of said second face is concave;
- said ridge of the upper wall faces said second face of said lower wall, while said joint line between said first and second faces lies opposite the rear flank of the upper wall, such that said second face is arranged with regard to said fuel injector with a part facing the rear flank of the upper wall and a part facing the front flank of said upper wall;
- said combustion chamber is formed between, on the one hand, said rear flank of said upper wall and, on the other hand, said first face and the corresponding part of said second face of said lower wall;
- said oxidant inlet is formed between the front flank of said upper wall and the corresponding part of said second face of said lower wall; and
- the sliding of the lower wall brings said joint line between said first and second faces closer to said fuel injector so as progressively to modify the geometries of said oxidant inlet and of said combustion chamber, said geometries passing progressively from a first state in which, for a Mach number lying between 1.5 and 3, said oxidant inlet constricts said oxidant flow only slightly and said combustion chamber is long and divergent, to a second state in which, for a Mach number lying between 8 and 12, said oxidant inlet strongly constricts said oxidant flow and said combustion chamber is shorter and exhibits a constant cross section.

Hence, by virtue of the present invention, by simply employing the linear or curvilinear translation of one of the walls of the ramjet, the progressive variation in the cross section of the combustion chamber and of the geometries of the oxidant inlet and of the nozzle are obtained, which makes it possible to match the ramjet to the conditions of flight of the aircraft, so as to obtain the maximum performance from it as regards either the thrust, or the specific impulse. To do this, the two walls of the ramjet, other than the two which are flat and parallel to each other, are profiled in such a way that said translation leads to very different cross section laws being imposed; an oxidant (air) inlet with a low degree of constriction associated with a long and divergent combustion chamber equipped with a geometric-nozzle neck for the low Mach numbers, and an air inlet with a high degree of constriction associated with a shorter combustion chamber with constant cross section for the high Mach numbers.

The implementation of the present invention therefore makes it possible to dispense with the variable-geometry wall of the ramjet of the document U.S. Pat. No. 5,727,382, with its drawbacks which are the hinges for articulation of the plates, the plurality of actuators for these plates, etc. In contrast, in the ramjet of the invention, a single actuator is necessary in order to achieve said translation. Furthermore, it is possible to accept an incomplete leaktightness of said wall which is movable in translation with said flat and parallel walls.

Said movable second wall is preferably shorter than said first upper wall.

Furthermore, in order to form, with said second face, a marked inlet neck (minimum cross section) for the oxidant flow, the ridge of said first wall exhibits the shape of a bevel.

The figures of the attached drawing will give a good understanding of how the invention can be produced. In these figures, identical references designate similar elements.

FIG. 1 shows, in a diagrammatic view in perspective, with partial cutaway, an examplary embodiment of the ramjet in accordance with the present invention.

FIG. 2 is a diagrammatic view in transverse section along the line II—II of FIG. 1.

FIG. 3 is a partial diagrammatic side view along the line III—III of FIG. 2.

FIG. 4 is a diagram, in diagrammatic longitudinal view, illustrating the main elements of the ramjet in accordance with the present invention.

Figure 5:
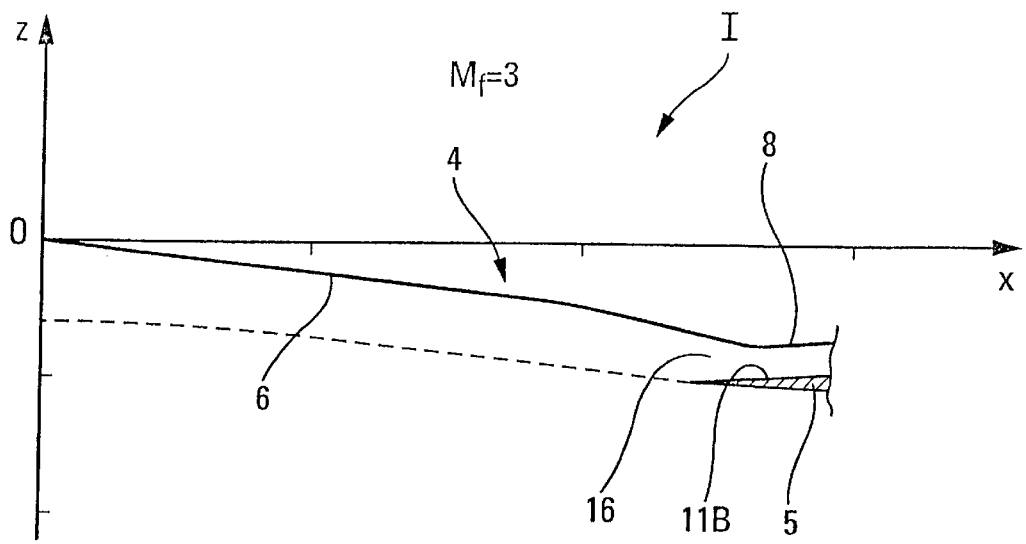
Figure 6:
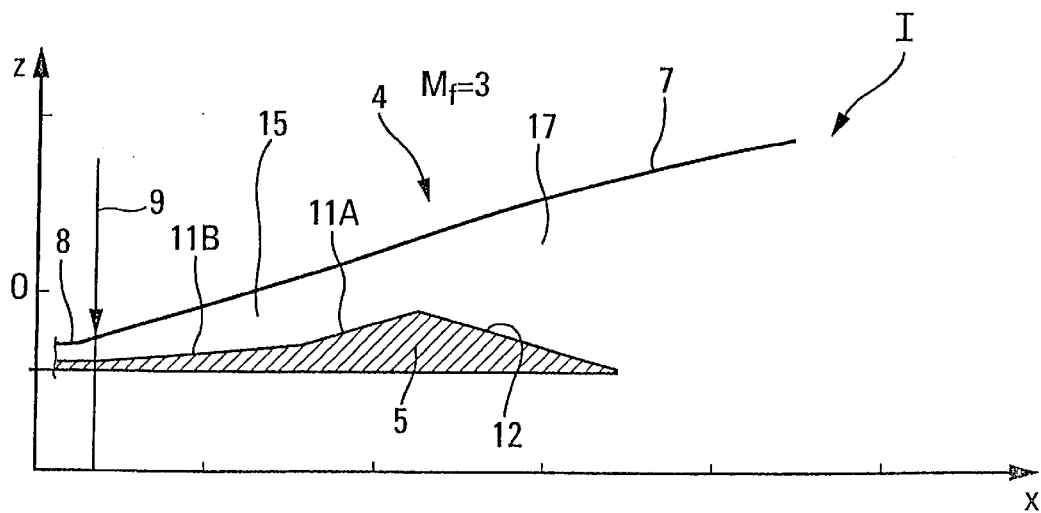

FIG. 5 and FIG. 6 respectively illustrate the relative positions of the main elements of said ramjet, at the front end and at the rear end thereof, for operation at Mach 3.

Figure 7:
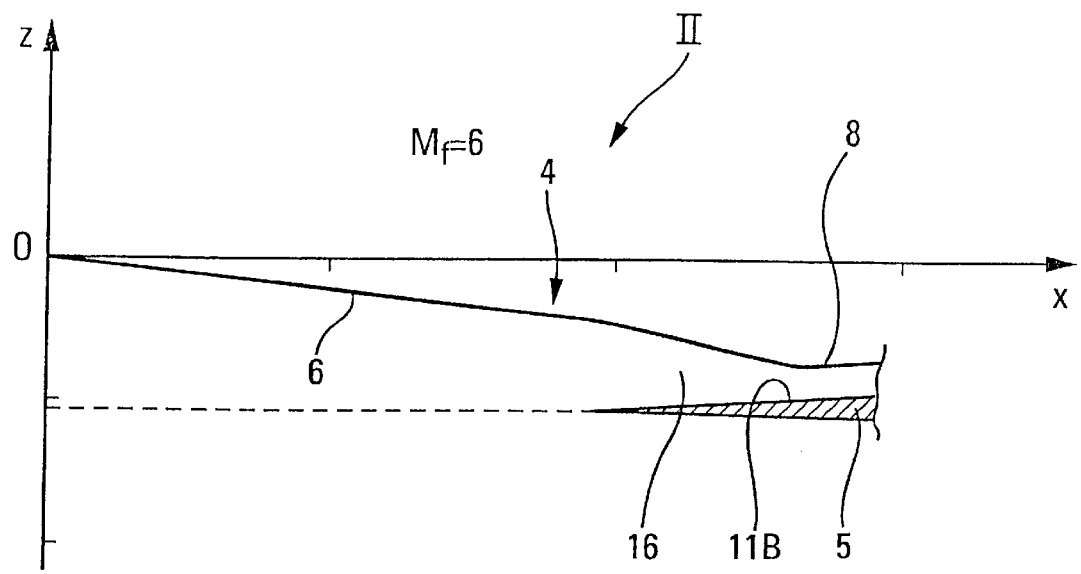
Figure 8:
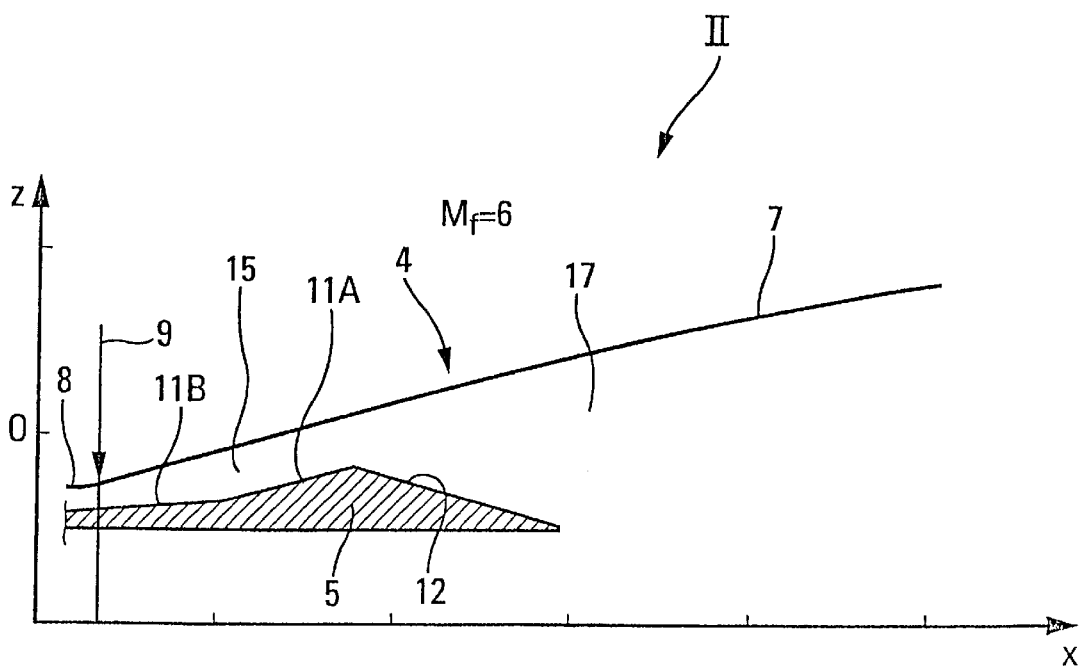

FIG. 7 and FIG. 8 correspond respectively to FIGS. 5 and 6, for operation of the ramjet at Mach 6.

Figure 9:
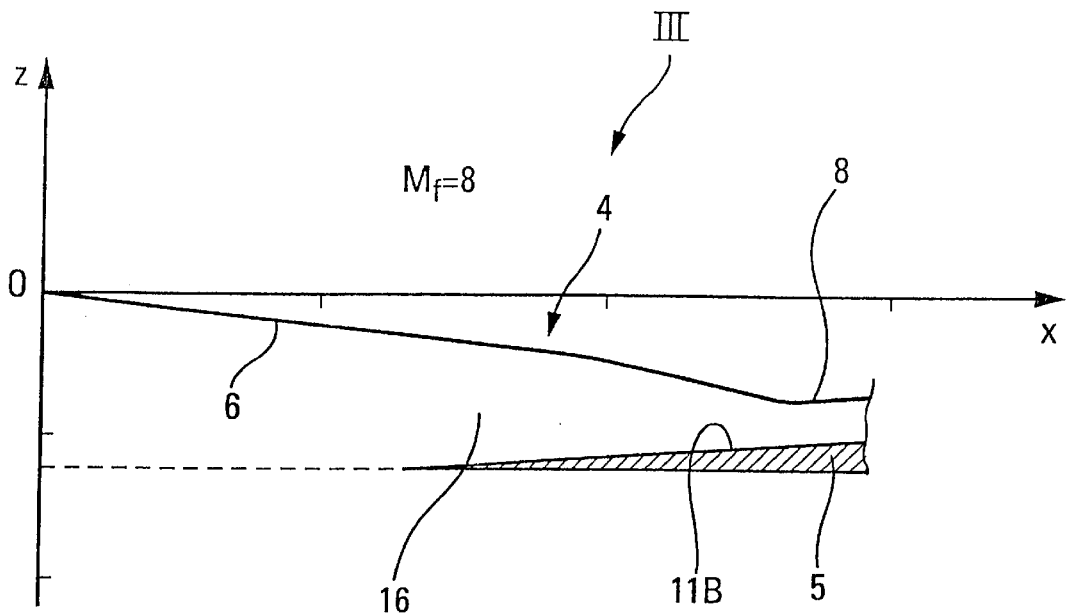
Figure 10:
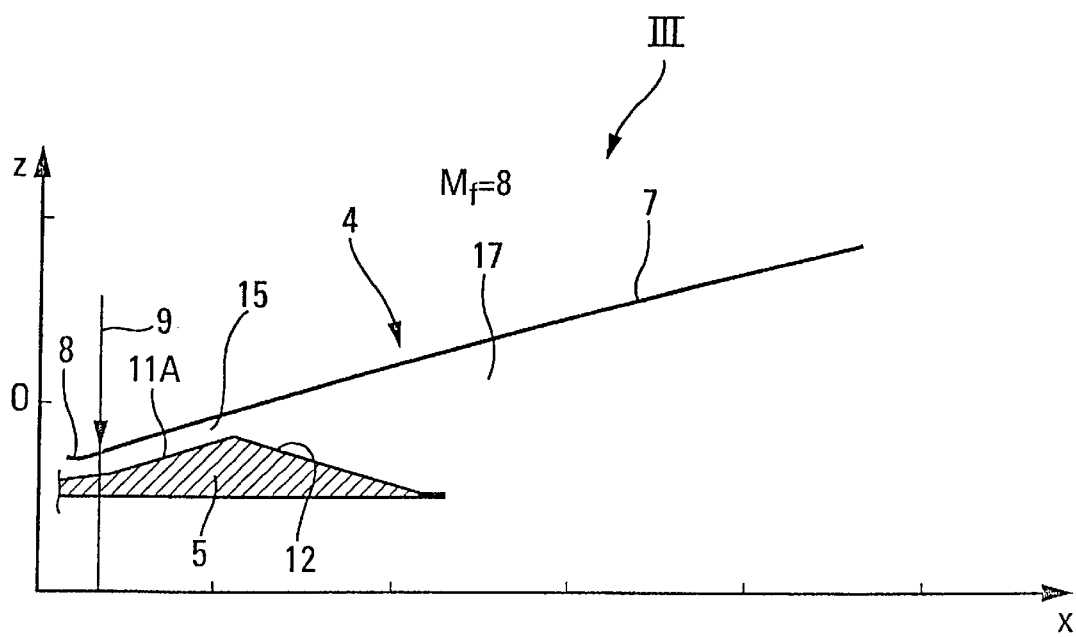

FIG. 9 and FIG. 10 correspond respectively to FIGS. 5 and 6, for operation of the ramjet at Mach 8.

FIG. 11 is a diagram indicating an altimetric-trajectory example, as a function of the flight Mach number, for the ramjet in accordance with the present invention.

FIG. 12 is a diagram indicating the specific impulse as a function of the flight Mach number, for said ramjet.

The ramjet for an aircraft according to the invention illustrated by FIGS. 1 to 4 includes an elongate ramjet body 1 consisting of four walls 2 to 5, opposite in pairs. The two opposite sidewalls 2 and 3 are flat and parallel to each other.

The upper wall 4 is integral with the two sidewalls 2 and 3 and it exhibits a general, fixed shape, with a V profile open at an obtuse angle. It includes a front flank 6 and a rear flank 7 which are inclined with respect to one another and linked by a beveled ridge 8. As illustrated by the figures, the front flank 6 and rear flank 7 may, in practice, each include facets which are slightly inclined with respect to one another.

Fuel injectors 9 are arranged in the vicinity of the ridge 8.

The lower wall 5, the length l of which is less than the length L of the upper wall 4, also exhibits a general, fixed shape, with a V profile open at an obtuse angle. It is inverted with respect to the upper wall 4. It includes a front flank 11 and a rear flank 12 which are inclined with respect to one another and linked by a ridge 13.

The front flank 11 of the lower wall 5 includes a first face 11A, the general direction of which is at least substantially parallel to the rear flank 7 of the upper wall 4, and which is arranged facing this latter flank 7. The flank 11 further includes a second face 11B, linked securely to said first face 11A along a joint line 14 and orthogonal to the sidewalls 2 and 3. The second face 11B is inclined with respect to the first face 11A so as to form a concavity facing the upper wall 4.

As can be seen clearly in FIG. 4 (drawn in a reference system with rectangular axes ox, oy and oz defined in FIG. 1 and in which the axes ox and oz are respectively parallel to the length and to the height of said ramjet):

the ridge 8 of the upper wall 4 is arranged facing the second face 11B of the lower wall 5;

the joint line 14 and the ridge 13 of the lower wall 5 are arranged facing the rear flank 7 of the upper wall 4;

the first face 11A of the lower wall 5 lies entirely opposite the rear flank 7 of the upper wall 4; and the second face 11B of the lower wall 5 lies opposite the injectors 9, the front part of said second face 11B being opposite the front flank 6 of the upper wall 4, whereas the rear wall of this face 11B is facing the rear flank 7 of the upper wall 4.

Hence, in the ramjet of FIGS. 1 to 4:

the combustion chamber 15 is formed between, on the one hand, the rear flank 7 of the upper wall 4 and, on the other hand, the first face 11A and the part of the second face 11B of the lower wall 5 which is opposite said rear flank 7;

the oxidant (air) inlet 16 is formed between the front flank 6 of the upper wall 4 and the part of the second face 11B of the lower wall 5 facing said front flank 6; and the exhaust nozzle 17 is formed between the rear flank 7 of the upper wall 4 and the rear flank 12 of the lower wall 5.

Furthermore, the lower wall 5 of the ramjet 2 is mounted movably, in its entirety, between said sidewalls 2 and 3, so as to be able to slide longitudinally in translation.

In FIG. 1, which is merely a diagrammatic illustration:

the sliding and guidance means have been represented in the form of external jacks 18, 19 and of spindles 20, 21 sliding in ramps 22, cutout into the sidewalls 2 and 3. Thus, the jacks 18, 19 can push the spindles 20, 21 which, guided by the ramps 22, slide in order to displace the lower wall 5 with respect to the upper wall 4 and to the sidewalls 2 and 3. Needless to say, such sliding and guidance means are only diagrammatic, and they could advantageously be replaced by motor means housed at least partly within said lower wall 5;

the ramp 22 represented by a solid line in FIG. 3 is rectilinear, but, needless to say, it could be curvilinear, as is illustrated in dashed lines; and the joints between the lower wall 5 and the sidewalls 2 and 3 have not been represented, nor the sealing system as regards the ramp 22.

Whatever the practical embodiment of said sliding and guidance means, it can easily be envisaged that they make it possible to displace said lower wall 5 so as to bring the joint line 14 progressively closer in translation to the injectors 9, so as progressively to modify the geometries of the oxidant inlet 16 and of the combustion chamber 15.

In FIG. 4, three successive positions of the lower wall 5 with respect to the other walls 2, 3 and 4 have been sketched, these successive positions being designated respectively by the references I, II and III, and corresponding, for example, to different flight Mach values Mf respectively.

In position I, illustrated in further detail in FIGS. 5 and 6 (FIG. 5 being to a scale twice that of FIG. 6) and corresponding to a relatively low flight Mach Mf equal to 3, it can be seen (FIG. 5) that the oxidant inlet 16 is relatively slightly convergent and imposes only a small degree of constriction on the oxidant flow, while (FIG. 6) the combustion chamber 15 is however long and divergent.

In position II (see FIGS. 7 and 8, with FIG. 7 to a scale twice that of FIG. 8) corresponding to an intermediate flight Mach Mf of 6 it can be seen that, by comparison with position I, the oxidant inlet 16 is more convergent and constricts the oxidant flow (FIG. 7) more strongly, while the combustion chamber 15 is less long and less divergent.

Finally, in position III (see FIGS. 9 and 10, with FIG. 9 to a scale twice that of FIG. 10) corresponding to a flight Mach Mf of a high value equal to 8, the oxidant inlet is strongly convergent and imposes a high degree of constriction on the oxidant flow and, simultaneously, the combustion chamber is short and features a constant cross section over its entire length.

Hence it is seen that, by virtue of the present invention, it is possible progressively to modify the geometries of the oxidant inlet 16 and of the combustion chamber 15 in step with the increase in the value of the flight Mach Mf so as to cause the geometries to change progressively from a first state, which is appropriate for a low supersonic flight Mach (Mach 1.5 to 3) and in which the oxidant inlet only slightly constricts the oxidant flow, and the combustion chamber is long and divergent, to a second state, which is appropriate to a high supersonic flight Mach (Mach 8 to 12) and in which said oxidant inlet strongly constricts the oxidant flow and said combustion chamber is short with a constant cross section.

The curve 23 of FIG. 11 illustrates an example of a variation in the altitude H (in km) of the ramjet as a function of the flight Mach number Mf. On this curve 23 have been indicated the operating points corresponding to the states I, II and III detailed above.

Likewise, on the curve 24 of FIG. 12, illustrating the variation in the specific impulse Isp (in m/s) as a function of the flight Mach number Mf, the points corresponding to said states I, II and III have been put in place.

What is claimed is:

1. A ramjet for a supersonic and hypersonic aircraft, including an elongate body which consists of:

two sidewalls, flat and parallel to each other;

a fixed upper wall, integral with said sidewalls and exhibiting, in profile, the rigid general shape of a V open at an obtuse angle, in such a way that said upper wall includes a front flank and a rear flank which are inclined with respect to one another and linked by a ridge which is at least approximately orthogonal to said sidewalls; and a lower wall mounted movably as one between said sidewalls so as to be able to slide longitudinally in translation, said lower wall also featuring, in profile, the rigid general shape of a V open at an obtuse angle, but reversed with respect to that of said upper wall, said lower wall thus including a front flank and a rear flank which are inclined with respect to one another and linked by a ridge at least approximately orthogonal to said sidewalls, said walls of said body delimiting between them:

an inlet for a flow of oxidant;

a combustion chamber, which is provided with at least one fuel injector and in which the oxidant/fuel mixing and the combustion of said mixture are carried out; and an exhaust nozzle, channeling the gases leaving said combustion chamber and formed between said rear flank of the upper wall and the rear flank of the lower wall, wherein:

said fuel injector is arranged in the vicinity of the ridge of said upper wall;

said front flank of the lower wall includes:

at least one first face, in a general direction at least substantially parallel to the rear flank of said upper wall and arranged facing said rear flank of said upper wall; and at least one second face, linked securely to said first face along a joint line at least approximately orthogonal to said sidewalls, said second face being inclined with respect to said first face in such a way that, facing said upper wall, the assembly of said first face and of said second face is concave;

said ridge of the upper wall faces said second face of said lower wall, while said joint line between said first and second faces lies opposite the rear flank of the upper wall, such that said second face is arranged with regard to said fuel injector with a part facing the rear flank of the upper wall and a part facing the front flank of said upper wall;

said combustion chamber is formed between, on the one hand, said rear flank of said upper wall and, on the other hand, said first face and the corresponding part of said second face of said lower wall;

said oxidant inlet is formed between the front flank of said upper wall and the corresponding part of said second face of said lower wall; and the sliding of the lower wall brings said joint line between said first and second faces closer to said fuel injector so as progressively to modify the geometries of said oxidant inlet and of said combustion chamber, said geometries passing progressively from a first state in which, for a Mach number lying between 1.5 and 3, said oxidant inlet constricts said oxidant flow only slightly and said combustion chamber is long and divergent, to a second state in which, for a Mach number lying between 8 and 12, said oxidant inlet strongly constricts said oxidant flow and said combustion chamber is shorter and exhibits a constant cross section.

2. The ramjet as claimed in claim 1, wherein the translation of said lower wall is rectilinear.

3. The ramjet as claimed in claim 1, wherein the translation of said lower wall is curvilinear.

4. The ramjet as claimed in claim 1, wherein the said lower wall is shorter than said upper wall.

5. The ramjet as claimed in claim 1, wherein the ridge of said upper wall exhibits the shape of a bevel so as, with said second face, to define a minimum inlet cross section for the flow of oxidant.

* * * * *